United States Patent
Yamamoto

(10) Patent No.: US 11,012,617 B2
(45) Date of Patent: May 18, 2021

(54) SEMICONDUCTOR DEVICE FOR IMAGE DISTORTION CORRECTION PROCESSING AND IMAGE REDUCTION PROCESSING

(71) Applicant: RENESAS ELECTRONICS CORPORATION, Tokyo (JP)

(72) Inventor: Akihiro Yamamoto, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/446,222

(22) Filed: Jun. 19, 2019

(65) Prior Publication Data
US 2020/0007755 A1    Jan. 2, 2020

(30) Foreign Application Priority Data

Jun. 28, 2018   (JP) .............................. JP2018-122797

(51) Int. Cl.
| | |
|---|---|
| *H04N 5/76* | (2006.01) |
| *H04N 5/232* | (2006.01) |
| *G06T 5/00* | (2006.01) |
| *G06T 3/40* | (2006.01) |
| *G06T 1/00* | (2006.01) |

(52) U.S. Cl.
CPC ....... *H04N 5/23229* (2013.01); *G06T 1/0007* (2013.01); *G06T 3/40* (2013.01); *G06T 5/002* (2013.01); *G06T 2207/10004* (2013.01)

(58) Field of Classification Search
CPC ..... H04N 5/23229; G06T 1/0007; G06T 3/40; G06T 5/002; G06T 2207/10004
USPC ........................................................ 348/231.99
See application file for complete search history.

(56) References Cited

U.S. PATENT DOCUMENTS

| | | | | |
|---|---|---|---|---|
| 8,724,007 | B2* | 5/2014 | Chen ..................... | H04N 5/247 348/345 |
| 8,842,190 | B2* | 9/2014 | Chen .................. | H04N 5/23238 348/222.1 |
| 10,735,643 | B1* | 8/2020 | Manzari .......... | H04N 5/232939 |
| 2014/0192246 | A1* | 7/2014 | Lee ..................... | H04N 5/2355 348/333.11 |

OTHER PUBLICATIONS

Reiji Suda: "Outline of GPU and GPGPU", Journal of the Institute of Image Information and Television Engineers, the Institute of Image Information and Television Engineers, Oct. 1, 2012, vol. 66, No. 10, p. 808-812.

* cited by examiner

*Primary Examiner* — Usman A Khan
(74) *Attorney, Agent, or Firm* — McDermott Will & Emery LLP

(57) ABSTRACT

A semiconductor device includes a distortion correction unit that performs correct distortion processing on a captured image, a SRAM that stores image data after the distortion correction processing, a filter processing unit that receives the image data after the distortion correction processing from the SRAM and that performs smoothing filter processing on the image data after the distortion correction processing, after the image data after the distortion correction processing having a size required for the smoothing filter processing is stored in the SRAM, and an image reduction unit that performs reduction processing on image data after the smoothing filter processing.

12 Claims, 10 Drawing Sheets

DIVIDED DISTORTION CORRECTION PROCESSING

SEMICONDUCTOR DEVICE FOR IMAGE DISTORTION CORRECTION PROCESSING AND IMAGE REDUCTION PROCESSING

CROSS-REFERENCE TO RELATED APPLICATIONS

The disclosure of Japanese Patent Application No. 2018-122797 filed on Jun. 28, 2018 including the specification, drawings and abstract is incorporated herein by reference in its entirety.

BACKGROUND

The present invention relates to a semiconductor device, an image recognition system, and an image processing method.

There is a demand in a market for correcting a distortion of a captured image caused by a camera lens, and further reducing an image after distortion correction by a plurality of reduction rates to generate a plurality of reduced images. For example, in image recognition processing, there are cases where an object cannot be recognized unless a size of the object in an image is a size at which the object is learned, and it is effective to generate a plurality of reduced images from the captured image and use them as a recognition target image.

Generally, a graphics processing engine such as a Graphic Processor Unit (GPU) is used for distortion correcting processing. In the graphics processing engine, data before distortion correction is read from an external memory via a cache memory, and data after distortion correction is written back to the external memory via the cache memory.

For example, FIG. 3 of Reiji Suda: "Outline of GPU and GPGPU", Journal of the Institute of Image Information and Television Engineers, the Institute of Image Information and Television Engineers, Oct. 1, 2012, Vol. 66, No. 10, p. 808-812 describes a memory hierarchical structure of a GPU, and in this figure, a rectangle with rounded corners indicates a GPU, a "global memory" indicates an external memory, an "L1 cache" indicates a cache memory, and an "L2 cache" indicates a cache memory. Also, in this GPU, data is always read from and written back to the external memory via the L1 and L2 caches.

SUMMARY

When data before the distortion correction is read from an external memory through a cache memory and data after the distortion correction is written back to the external memory through the cache memory as in the background art, if many Central Processing Units (CPUs) and accelerators are connected to the external memory, there is a problem that a processing time becomes longer, and a transfer bandwidth of a bus and the external memory is consumed much.

Therefore, there has been a demand for a semiconductor device, an image recognition system, and an image processing method that can reduce an image after the distortion correction without outputting the image to an external memory. Other objects and new features will be apparent from the descriptions of this specification and the accompanying drawings.

According to one embodiment, a semiconductor device includes a distortion correction unit that performs correct distortion processing on a captured image, a SRAM that stores image data after the distortion correction processing, a filter processing unit that receives the image data after the distortion correction processing from the SRAM and that performs smoothing filter processing on the image data after the distortion correction processing, after the image data after the distortion correction processing having a size required for the smoothing filter processing is stored in the SRAM, and an image reduction unit that performs reduction processing on image data after the smoothing filter processing.

According to the above-described embodiment, it is possible to provide a semiconductor device, an image recognition system, and an image processing method that reduce an image after distortion correction without outputting the image to an external memory.

Note that a microcomputer or a chip as the semiconductor device of the above embodiment, an image processing circuit configuring a part of the semiconductor device, a monitoring system using the semiconductor device, an Advanced Driver Assistance System (ADAS), and the like are also useful as aspects of the present invention.

DETAILED DESCRIPTION

Figure 1:
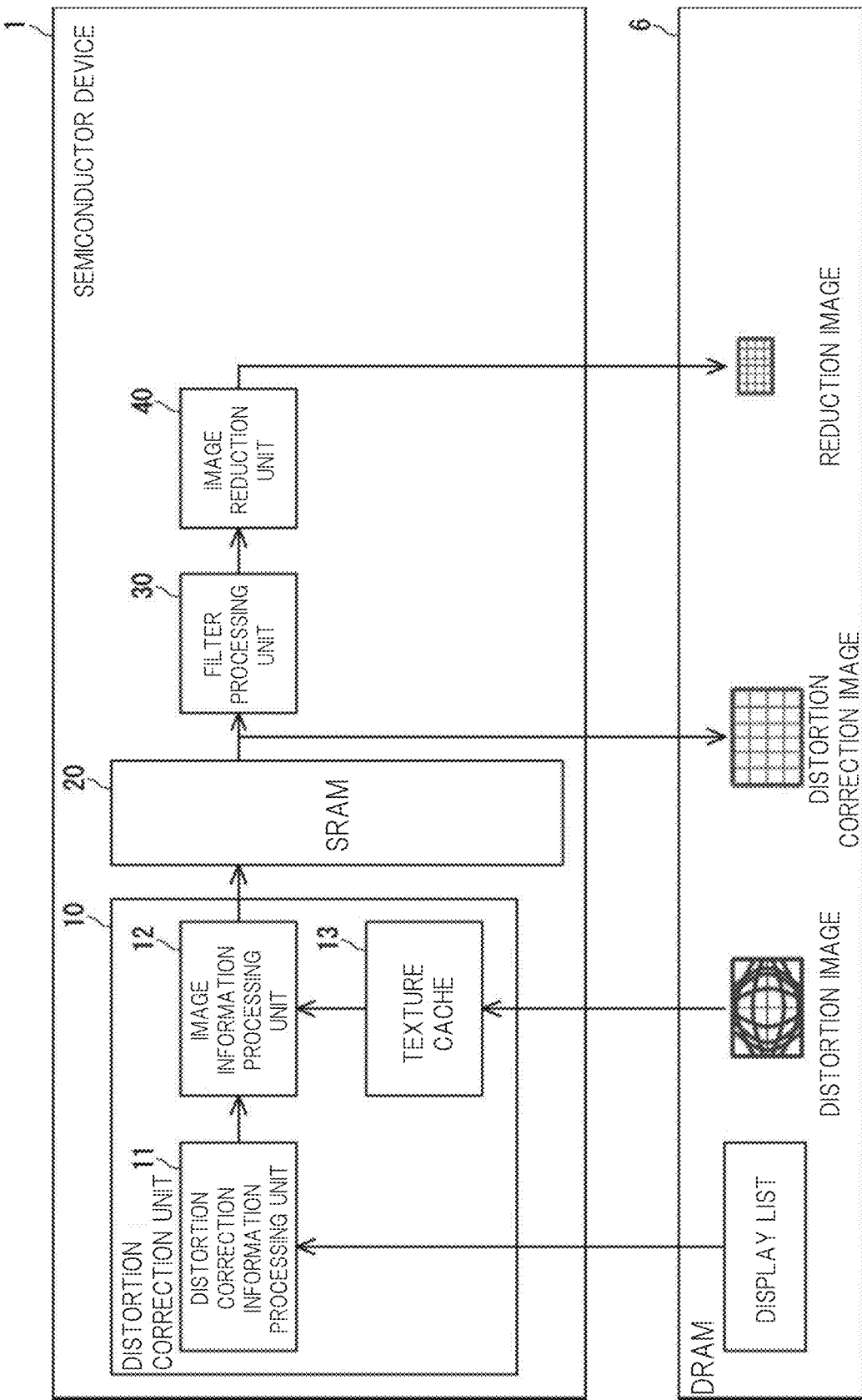
FIG. 1 is a block diagram showing a schematic configuration of a semiconductor device 1 according to a first embodiment.

For clarity of explanation, the following description and drawings are appropriately omitted and simplified. Each element described in the drawings as a functional block for performing various processes can be configured by a CPU, a memory, other circuits, or the like in terms of hardware, and can be realized by a program loaded in a memory or the like in terms of software.

Therefore, it is understood by those skilled in the art that these functional blocks can be realized in various forms by hardware alone, software alone, or a combination thereof, and the present invention is not limited to any of them. In the drawings, the same elements are denoted by the same reference numerals, and a repetitive description thereof is omitted as necessary.

The programs described above may also be stored and supplied to a computer using various types of non-transitory computer readable media.

The non-transitory computer readable media include various types of tangible storage media. Examples of the non-transitory computer readable media include magnetic storage media (e.g., such as a floppy disk, a magnetic tape, a hard disk drive), optical magnetic storage media (e.g., a magneto-optical disk), a Compact Disc-Read Only Memory (CD-ROM), a CD-R, a CD-R/W, and a semiconductor memory (e.g., a mask ROM, a Programmable ROM (PROM), an Erasable PROM (EPROM), a flash ROM, a Random Access Memory (RAM)).

The programs may also be supplied to computers using various types of non-transitory computer readable media. Examples of the non-transitory computer readable media include an electrical signal, an optical signal, and an electromagnetic wave. The non-transitory computer readable medium can supply programs to computers, through a wired communication path such as an electric wire, an optical fiber, or the like, or a wireless communication path.

First Embodiment

Next, a semiconductor device according to a first embodiment in which distortion correction processing is performed on a captured image, an image after the distortion correction is output not to an external memory but to a normal memory provided on the same semiconductor substrate as the semiconductor device, and smoothing processing and image reduction processing are performed after data for one image is written in the normal memory will be described.

Note that "normal memory" in the present specification refers to a memory other than a memory such as a cache memory in which data may need to be taken from another memory region (external memory) because data does not exist in the memory depending on addresses to be accessed, and in the following embodiments, a buffer Static Random Access Memory (SRAM) is used as the normal memory. An image after the distortion correction processing and an image after the image reduction processing according to each embodiment are used, for example, as a recognition target image in image recognition processing.

First, a configuration of the semiconductor device according to the first embodiment will be described. FIG. 1 is a block diagram showing a schematic configuration of a semiconductor device 1 according to the first embodiment. In order to make the following description easier to understand, a flow of data inside and outside the semiconductor device 1 is also shown.

In the following drawings, an image having a pattern in which straight lines and curve lines are combined is used as an example of a distortion image, and an image having a lattice pattern is used as an example of an image after distortion correction, reduction, or rotation, however, for the sake of clarity of the drawings, the number of lines in each pattern is not matched before and after the distortion correction.

The semiconductor device 1 is configured by a single semiconductor substrate, i.e., one chip, and includes a distortion correction unit 10, a buffer SRAM 20, a filter processing unit 30, an image reduction unit 40, and the like. As described above, the distortion correction unit 10, the buffer SRAM 20, the filter processing unit 30, the image reduction unit 40, and the like can be realized in various forms by hardware (e.g., circuit) alone, software alone, or a combination thereof.

The distortion correction unit 10 receives a distortion image in which a distortion occurs in patterns by a camera lens from an external memory (DRAM) 6, corrects the distortion, and outputs image data after the distortion correction to the buffer SRAM 20. As described above, until now, image data after distortion correction has been output to an external memory via a cache memory having a memory capacity of, for example, about 1 MB.

The buffer SRAM 20, which is the normal memory, stores the image data after the distortion correction, and when the buffer SRAM 20 stores the image data for one image, the buffer SRAM 20 outputs the image data to the filter processing unit 30. The buffer SRAM 20 can also output the image after the distortion correction (distortion correction image) to the DRAM 6. The distortion correction image (non-reduction image) outputted to the DRAM 6 is used, for example, as the recognition target image in the image recognition processing.

The filter processing unit 30 performs filter processing for applying a Gaussian filter, an averaging filter, or the like on the distortion correction image to smooth the distortion correction image, and outputs a smoothed image to the image reduction unit 40. The image reduction unit 40 reduces the smoothed image and outputs a reduced image (reduction image) to the DRAM 6. Here, the reduction image outputted to the DRAM 6 is also used, for example, as the recognition target image in the image recognition processing.

The distortion correction unit 10 includes a distortion correction information processing unit 11, an image information processing unit 12, a texture cache 13, and the like in order to perform the distortion correction processing described above. The distortion correction information processing unit 11 receives a display list which is a command sequence enumerating graphics drawing processing, from the DRAM 6, interprets distortion correction information described on the display list, and outputs image shape correction information to the image information processing unit 12.

The image information processing unit 12 receives the image shape correction information, receives a distortion image from the DRAM 6 via the texture cache 13, performs distortion correction on the image, and outputs the image data after the distortion correction to the buffer SRAM 20. The image data after the distortion correction includes, for example, information such as a pixel position and a pixel value. It is needless to say that the distortion correction unit 10 may have a configuration other than the configuration described above and perform well-known distortion correction other than the distortion correction described above.

Figure 2:
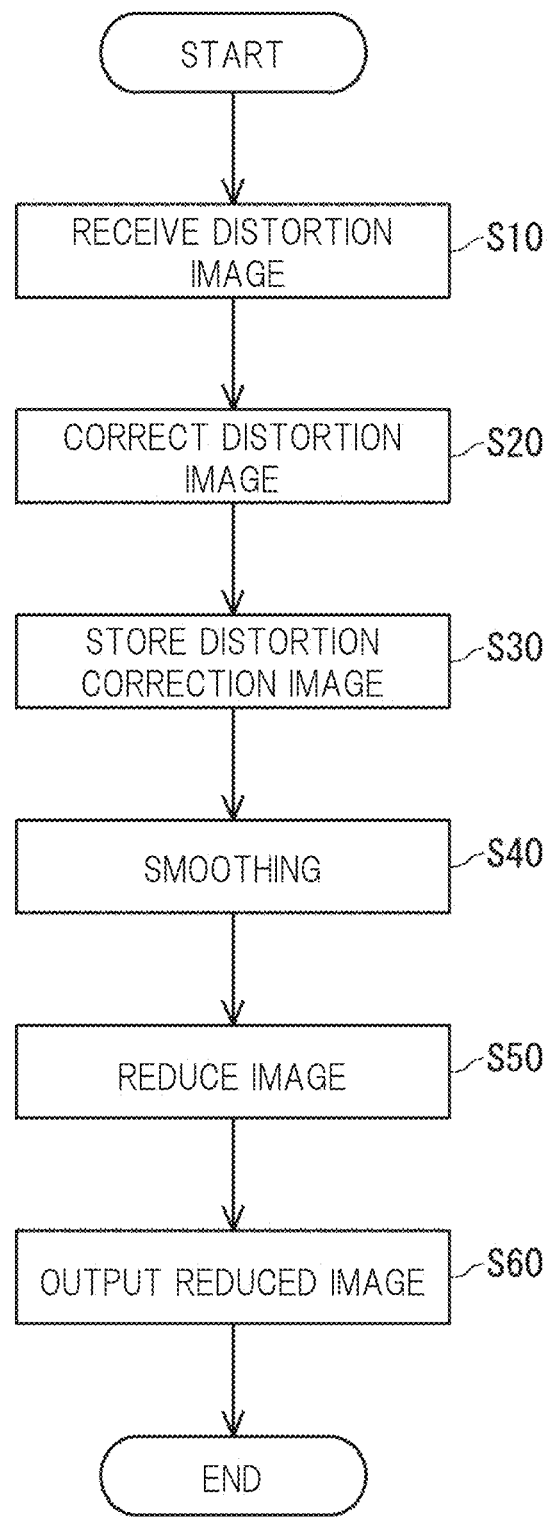
FIG. 2 is a flowchart for explaining a processing procedure of an image processing method according to the first embodiment.

Next, an operation of the semiconductor device 1 according to the first embodiment, that is, an image processing method will be described. FIG. 2 is a flowchart for explaining a processing procedure of the image processing method according to the first embodiment.

When the semiconductor device 1 starts to operate, the distortion correction unit 10 receives the display lists and the distortion image from the DRAM 6 (step S10), performs the distortion correction processing (step S20), and stores the distortion correction image data in the buffer SRAM 20 (step S30).

Figure 3:
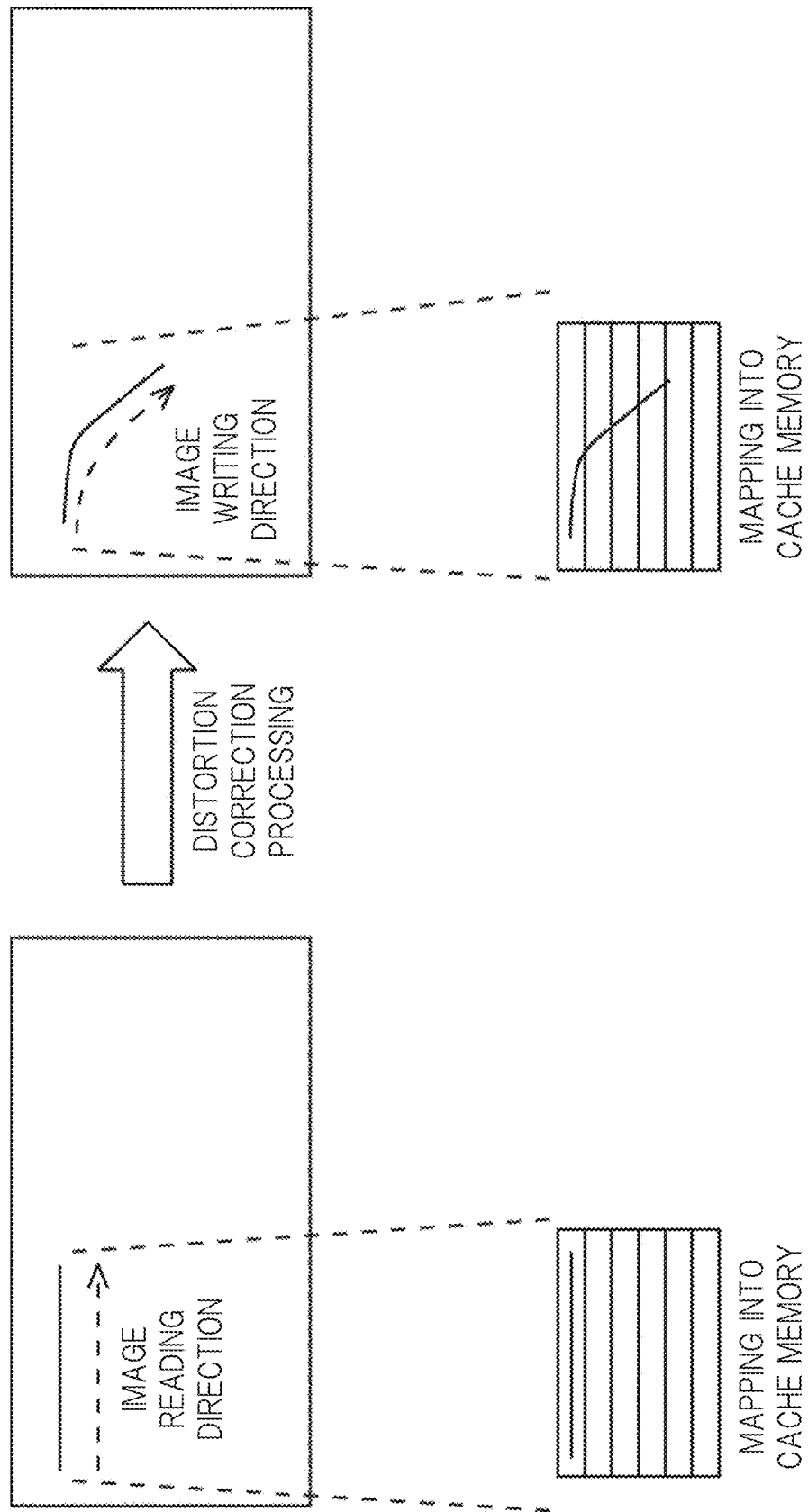
FIG. 3 is a diagram showing an example of mapping an image into a cash memory before and after distortion correction processing.

Here, the reason why the distortion correction image is stored in the buffer SRAM 20, not in the cache memory, will be briefly described. FIG. 3 is a diagram showing an example of mapping an image to a cache memory before and after distortion correction processing. The left figure shows an example of a straight line pattern before distortion correction and mapping the straight line pattern before the distortion correction to the cache memory, and the right figure shows an example of a curve line after the distortion correction pattern and mapping the curve line after the distortion correction pattern to the cache memory.

In the distortion correction processing, the straight line pattern before the distortion correction may be corrected to the curve line pattern after the distortion correction. Therefore, as shown in FIG. 3, the straight line pattern mapped to one line (block) before the distortion correction may be mapped to a plurality of lines as the curve line pattern after the distortion correction.

If a cache miss occurs when such a curve line pattern is written back (output) to the external memory after the distortion correction processing, the pattern written to each line of the cache memory in a tooth-missing state may be output to the external memory as it is in the tooth-missing state.

Further, as will be described below, since data of target pixels and peripheral pixels are needed for the filter processing subsequent to the distortion correction processing, it is better to store the distortion correction image in the buffer SRAM 20 according to the first embodiment, rather than in the cache memory in which the data becomes insufficient due to an eviction of a line.

Next, after storing the distortion correction image data for one image (one frame), the buffer SRAM 20 outputs the distortion correction image to the filter processing unit 30. In a second embodiment and subsequent embodiments, the buffer SRAM 20 does not necessarily store the distortion correction image data for one image, and when storing the distortion correction image data having a size equal to or larger than a size required for subsequent filter processing, the buffer SRAM 20 can also output the distortion correction image data to the filter processing unit 30. The filter processing unit 30 performs smoothing processing on the distortion correction image and outputs a smoothing image to the image reduction unit 40 (step S40).

Here, the reason why the image smoothing processing is performed before the image reduction processing will be briefly described. Simply thinning pixels in a vertical direction and a horizontal direction when reducing an image is impractical because much information is lost. For instance, if an input image including patterns in which the white and black pixels appears alternately in a horizontal direction, for example, ○•○•○•○•○• is simply thinned and reduced to ½, an output image becomes an image having pixels of only white color, that is, ○○○○○ or an image having pixels of only black color, that is, •••••, so characteristics information of the input image is lost.

For this reason, a smoothing filter is applied to an image before reduction processing, and then the image is reduced. As the smoothing filter, the Gaussian filter, the averaging filter, or the like is used. These filters perform convolving processing on peripheral pixels with respect to a target pixel.

Figure 4:
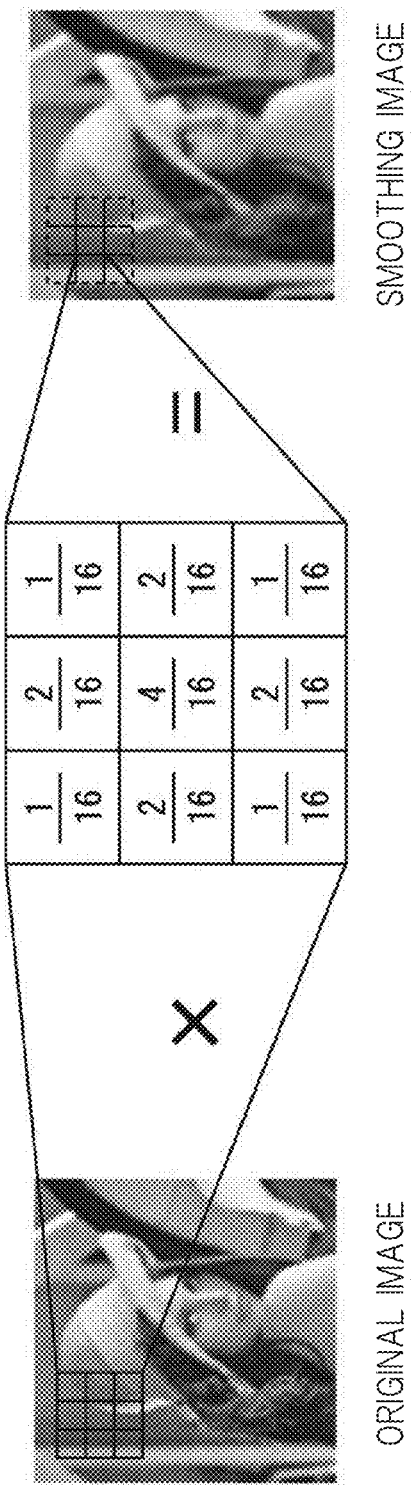
FIG. 4 is a diagram showing an example of image smoothing by a 3×3 Gaussian filter.

FIG. 4 is a diagram showing an example of image smoothing by a 3×3 Gaussian filter. A left figure shows one (Lenna image) of standard images used for performance comparison of image processing methods, and a right figure shows an image (smoothing image) after the smoothing processing. As described above, in order to reduce an image, smoothing is required before reducing, and it is required that not only a pixel value of a target pixel but also pixel values of peripheral pixels are available for smoothing, and as described above, it is better to store the distortion correction image in the buffer SRAM in which the tooth-missing state does not occur, rather than in the cache memory in which the tooth-missing state can occur.

Next, the image reduction unit 40 reduces the smoothing image (step S50) and outputs a reduced image to the DRAM 6 (step S60), and the operation of the semiconductor device 1 is completed. As described above, according to the semiconductor device or the image processing method of the first embodiment, the image after distortion correction can be reduced without outputting the image to the external memory, the processing time is shortened, and the transfer bandwidth of the bus or the external memory is not consumed.

Figure 5:
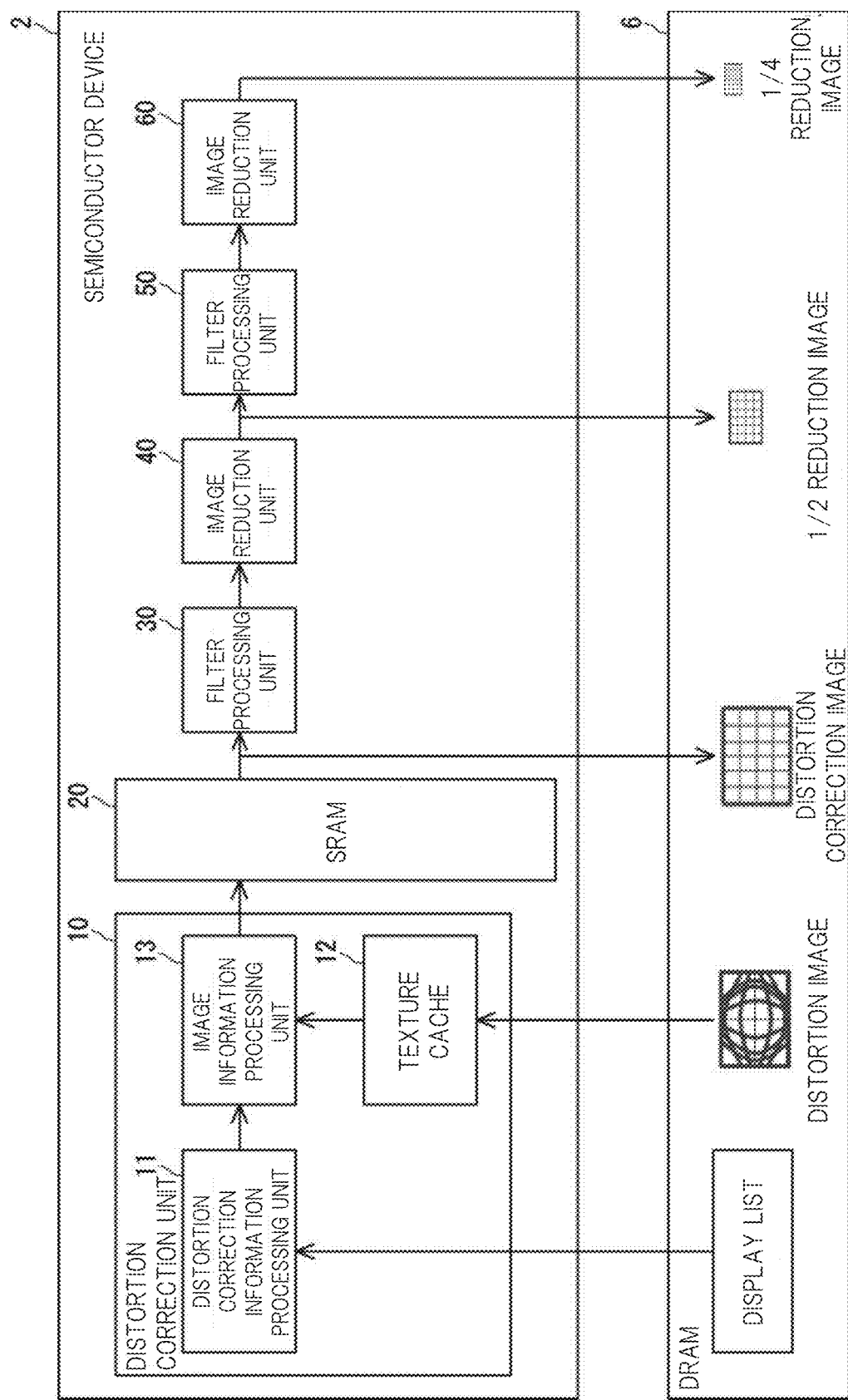
FIG. 5 is a diagram showing a schematic configuration of a semiconductor device 2 according to the first embodiment.

The semiconductor device according to the first embodiment may include a plurality of image reduction units in series to output a plurality of reduced images each having a different reduction rate. FIG. 5 is a diagram showing a schematic configuration of a semiconductor device 2 according to the first embodiment. The semiconductor device 2 has a configuration in which a filter processing unit 50 and an image reduction unit 60 are added to the semiconductor device 1 described above. It is needless to say that a larger number of filter processing units and image reduction units may be provided. According to such a configuration, it is possible to obtain a plurality of reduced images each having a different reduction rate without writing back the image data to the external memory and reading out the image data from the external memory, and it is possible to further improve a recognition rate of image recognition by using them as recognition target images of image recognition processing, for example.

As described above, the semiconductor device according to the first embodiment includes, on a single semiconductor substrate, the distortion correction unit 10 for correcting distortion of a captured image, the SRAM 20 for storing image data after distortion correction, the filter processing unit 30 for receiving image data after distortion correction from the SRAM 20 and for performing filter processing on the received image data after the image data after the distortion correction having a size required for the smoothing filter processing is stored in the SRAM 20, and the image reduction unit 40 for reducing an image after filter processing.

Further, the image processing method of the semiconductor device according to the first embodiment includes the step S20 of correcting distortion of a captured image, the step S30 of storing image data after distortion correction in the SRAM 20, the step S40 of reading image data after distortion correction from the SRAM 20 and of performing filter processing on the read image data after storing the image data after the distortion correction having a size required for the smoothing filter processing in the SRAM 20, and the step S50 of reducing an image after filter processing, and those steps are performed on a single semiconductor substrate in the semiconductor device.

Second Embodiment

The semiconductor device 1 according to the first embodiment stores image data for one image after distortion correction in the normal memory 20, and thereafter reads the image data from the normal memory 20 to perform filter processing and image reduction processing. On the other hand, in order to reduce the memory capacity of the normal memory for storing image data after distortion correction, a semiconductor device according to the second embodiment reads images obtained by dividing a distortion image as "divided distortion images", sequentially performs distortion correction processing on each of the divided distortion images, sequentially stores, as "divided distortion correction images", the divided distortion images after the distortion correction in the normal memory having a small memory capacity, and then performs filter processing and reduction processing in order.

The configuration of the semiconductor device according to the second embodiment is the same as the configuration of the semiconductor device 1 according to the first embodiment except that the capacity of the buffer SRAM is reduced and the distortion correction unit reads a divided distortion image from the DRAM based on information stored in the DRAM, and the illustration and detailed explanation thereof are omitted here. In the following description, the semiconductor device according to the second embodiment will be described using the same reference numerals as those of the semiconductor device 1 according to the first embodiment.

Figure 6:
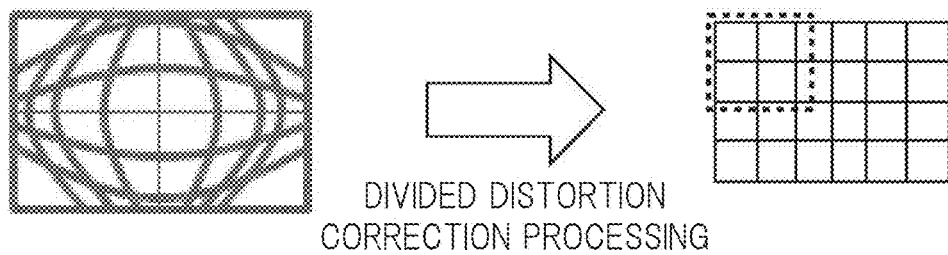
FIG. 6 is a diagram for explaining a correspondence between a distortion image and a divided distortion correction image according to a second embodiment.

FIG. 6 is a diagram for explaining a correspondence relationship between a distortion image and a divided distortion correction image according to the second embodiment. A left figure shows a distortion image before division having a combined pattern of curve lines and straight lines, similar to that shown in FIG. 1 and the like. In addition, a right figure shows a distortion correction image having grid patterns and a memory region (a region surrounded by a broken line) of a buffer SRAM having a small capacity. The distortion correction image is composed of a plurality of pieces of divided distortion correction image data, and the respective pieces of divided distortion correction image data are written in a single memory region of the buffer SRAM 20 and read from the memory region. In an example shown in FIG. 6, the distortion correction image is composed of six pieces of divided distortion correction image data, and writing and reading of the divided distortion correction image data into and from the memory region are repeated six times.

In this example, the memory capacity of the buffer SRAM 20 is determined in view of performance and manufacturing costs, and the distortion correction is performed by dividing the distortion image into six regions so as to match the memory capacity, but the lattice pattern after combining the divided distortion correction images can be the same as the lattice pattern after distortion correction shown in FIG. 1 and the like.

The divided distortion image is read from the DRAM 6 based on the information stored in the DRAM 6 so that the divided distortion correction image has a rectangular shape, but the memory region of the buffer SRAM and the divided distortion correction image data must have at least a region or data having a size required for filter processing and for example, if a 3×3 filter is used, the memory region of the buffer SRAM and the divided distortion correction image data must have a region or data having a size of at least the 3×3 pixels.

Note that one pixel or several pixels at an outermost periphery of an image before filter processing cannot be subjected to the filter processing because peripheral pixels necessary for the filter processing are not arranged, and a result of the filter processing of the pixel cannot be obtained. Therefore, the image after the filter processing is smaller than the image before the filter processing by one pixel or several pixels at the outermost periphery.

For example, in the example of the filter processing shown in FIG. 4, when a 3×3 filter is applied to a divided original image of 100×100 pixels, a divided smoothing image of 98×98 pixels is obtained. When a 5×5 filter is applied to the divided original image of 100×100 pixels, a divided smoothing image of 96×96 pixels is obtained. Even if the divided smoothing images in which information around the images are lost are trying to be combined as described above, positions of lines and graphic patterns between the images are misaligned, and the original patterns cannot be reproduced, and consequently, recognition accuracy of image recognition processing using the combined image is lowered.

Figure 7:
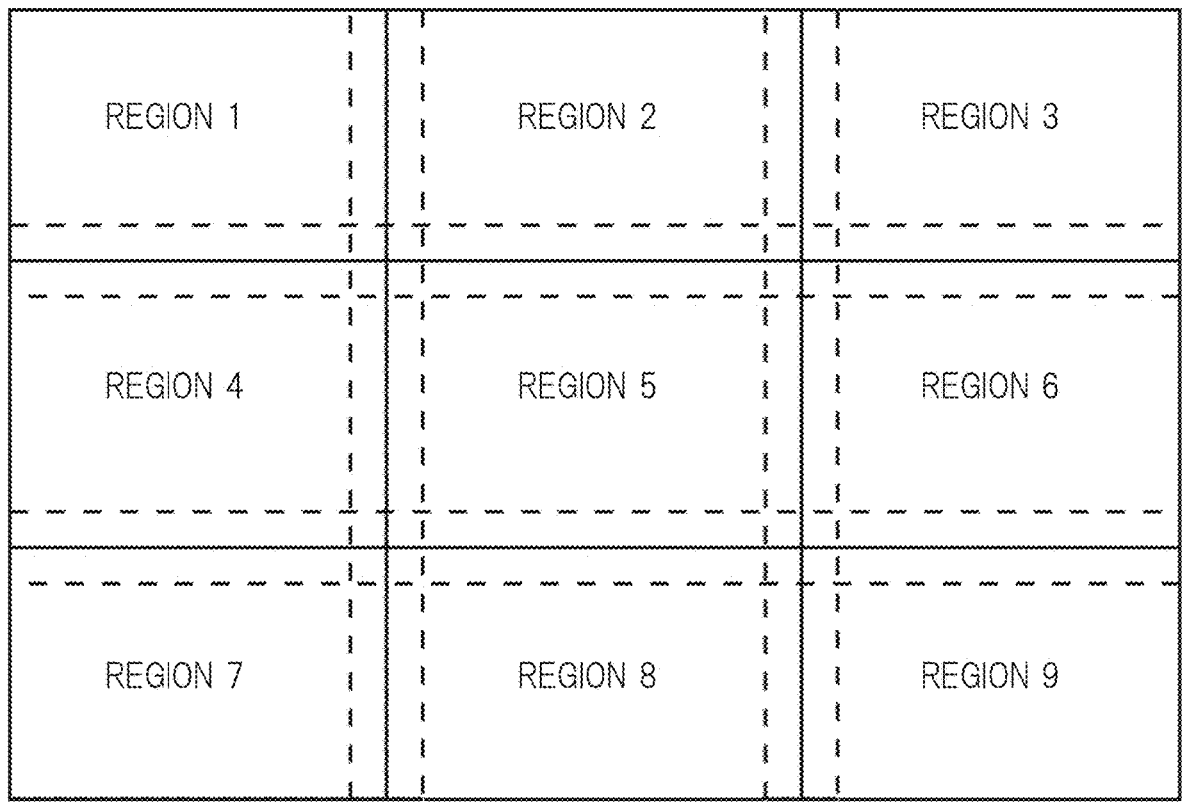
FIG. 7 is a diagram showing an example of division of a distortion image according to the second embodiment.

Therefore, when the distortion correction processing is performed after the distortion image is divided, an overlapping region may be formed between the divided distortion images in consideration of a fact that the image becomes small after the filter processing. FIG. 7 is a diagram showing an example of division of a distortion image according to the second embodiment. Solid lines in FIG. 7 indicate division lines when the distortion image is divided into regions 1 to 9 (divided distortion images) without providing overlapping regions. Broken lines in FIG. 7 indicate division lines when the distortion image is divided into the regions 1 to 9 (divided distortion images) by providing the overlapping regions.

When a 3×3 filter is used for filter processing, for example, the region 1 is a region surrounded by the broken lines, in which a right side of the region and a lower side of the region are larger by one pixel than the solid lines, in consideration of a fact that each side of an outer periphery of the region becomes smaller by one pixel. Similarly, the region 2 is a region surrounded by the broken lines, in which a left side of the region, a lower side of the region and a right side of the region are larger by one pixel than the solid lines. That is, the overlapping region for two pixels is formed between the region 1 and the region 2.

When a 5×5 filter is used for filter processing, an overlapping region for four pixels is formed between the region 1 and the region 2 in consideration of a fact that each side of the outer periphery of the region becomes smaller by two pixels. On the other hand, depending on a reduction rate in reduction processing, such an overlapping region may not be provided in some cases.

For example, when a 3×3 filter is used for filter processing and an image after the filter processing is reduced to ⅓ by reduction processing, it is not necessary to provide an overlapping region. In addition, when a 3×3 filter is used for filter processing and an image after the filter processing is reduced to ½ by reduction processing, it is necessary to provide the overlapping region.

Similarly, when a 5×5 filter is used for filter processing and an image after the filter processing is reduced to ⅕ by reduction processing, it is not necessary to provide an overlapping region, but when a 5×5 filter is used for filter processing and an image after the filter processing is reduced to ⅓ or ½ by reduction processing, it is necessary to provide the overlapping region. That is, in the case where a size of a region to be cut by reduction and a size of an image peripheral region to be lost by filter processing coincide with each other, or in the case where the region to be cut by the reduction is larger than the image peripheral region to be lost by the filter processing, it is not necessary to provide an overlapping area, and in the case where the image peripheral region to be lost by the filter processing is larger than the region to be cut by the reduction, it is necessary to provide the overlapping area.

When this is generalized by using the number k of a weighting coefficient per one side of a filter (for example, 3 for a 3×3 filter, 5 for a 5×5 filter) and a reduction rate R (for example, ⅓, ½) of the image, an overlapping region is unnecessary when 1/k≥R, and the overlapping region is necessary when 1/k<R.

As described above, according to the semiconductor device (or the image processing method) of the second embodiment, an image after distortion correction can be reduced without outputting the image to the external memory 6, and the capacity of the normal memory 20 that stores the image data after the distortion correction can be reduced. As described above, in the semiconductor device according to the second embodiment, it is preferable that the distortion correction unit 10 sequentially corrects divided images obtained by dividing a captured image into images each having a size required for filter processing, and the filter processing unit 30 performs the filter processing after the corrected image data corresponding to the divided images is stored in the SRAM 20.

In addition, the semiconductor device according to the second embodiment preferably has a region in which plural divided images overlap with each other. Further, in the semiconductor device according to the second embodiment, it is preferable that the overlapping region is provided when the inverse number of a weighting coefficient per one side of a filter used for filter processing is smaller than a reduction rate at the time of reducing an image.

Third Embodiment

The semiconductor device 1 according to the first embodiment stores an image data for one image after distortion correction in the normal memory 20, and then reads the image data to perform filter processing and image reduction processing. On the other hand, a semiconductor device according to a third embodiment divides a memory region of a normal memory that stores image data after distortion correction into a plurality of divided memory regions, and when writing image data after distortion correction in a certain divided memory region, the semiconductor device reads image data after distortion correction from another divided memory region to output the read image data to the filter processing unit. In this way, distortion correction processing, filter processing, and reduction processing can be performed in parallel.

A configuration of the semiconductor device according to the third embodiment is the same as the configuration of the semiconductor device 1 according to the first embodiment except that the memory region of the buffer SRAM is divided into a plurality of divided memory regions, and the distortion correction unit reads a divided distortion image from the DRAM based on information stored in the DRAM, and the illustration and detailed explanation thereof are omitted here. In the following, the semiconductor device according to the third embodiment will be described using the same reference numerals as those of the semiconductor device 1 according to the first embodiment.

Figure 8:
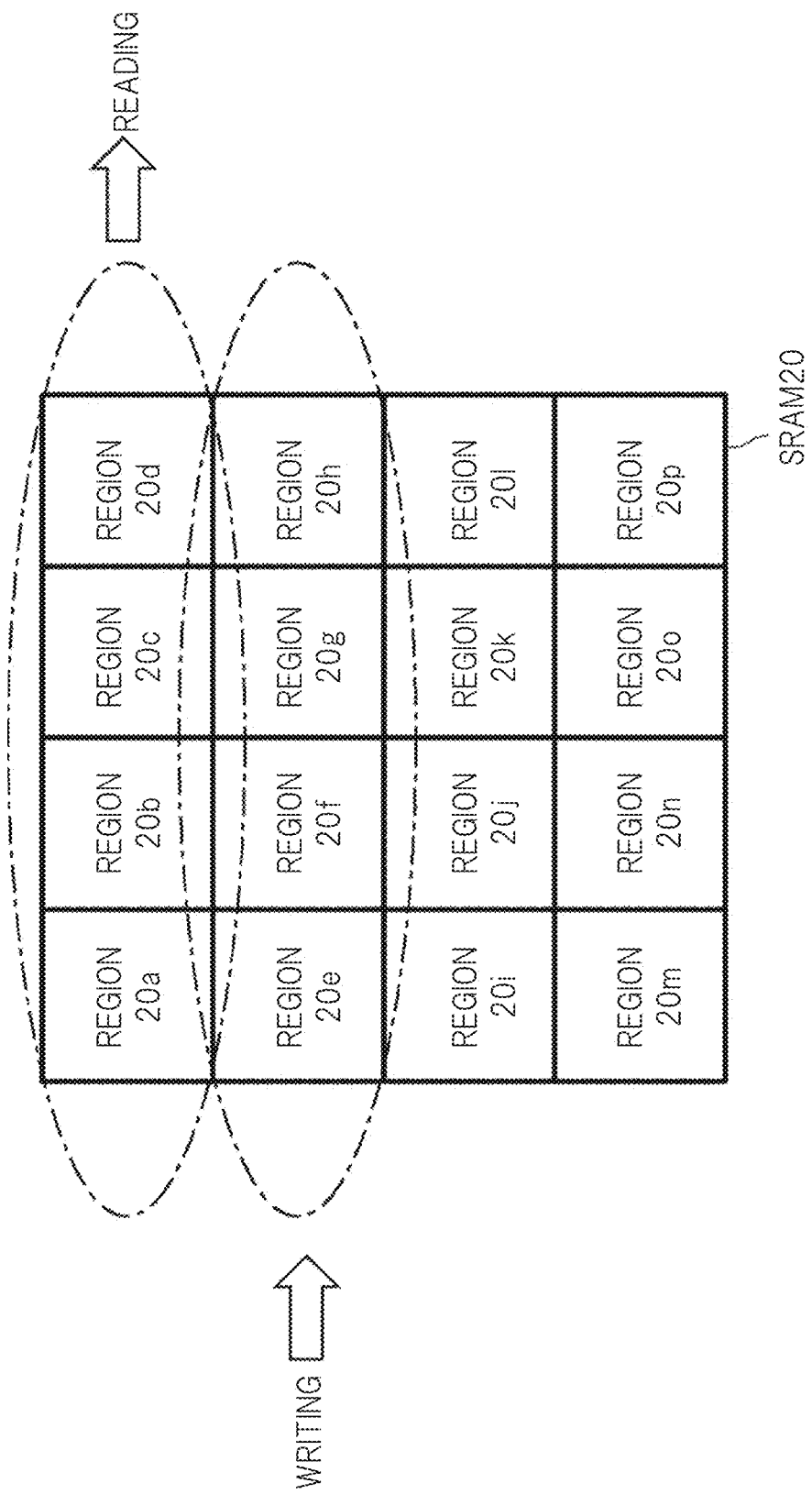
FIG. 8 is a diagram for explaining divided memory regions 20a to 20p of a buffer SRAM 20 and reading operation from or writing operation to each of the divided memory regions 20a-20p according to a third embodiment.

FIG. 8 is a diagram for explaining divided memory regions 20*a* to 20*p* of the buffer SRAM 20 and reading operation from or writing operation to each of the divided memory regions 20*a*-20*p* according to a third embodiment. The buffer SRAM 20 is divided into the divided memory regions 20*a* to 20*p* by 4×4, and distortion correction image data from the distortion correction unit 10 is stored in the divided memory regions 20*a* to 20*p* in this order.

Then, when the distortion correction image data is stored in the divided memory regions 20*a* to 20*d* of the uppermost row and starts to be stored in the divided memory regions 20*e* to 20*h* of the second row, the distortion correction image data stored in the divided memory regions 20*a* to 20*d* of the uppermost row is output to the filter processing unit 30, and the filter processing is performed. Of course, when the distortion correction image data starts to be stored in the divided memory regions 20*i* to 20*l* of the third row or the divided memory regions 20*m* to 20*p* of the fourth row, the distortion correction image data stored in the divided memory regions 20*a* to 20*d* of the uppermost row may be output to the filter processing unit 30.

That is, by dividing the buffer SRAM 20, distortion correction processing by the distortion correction unit 10 and smoothing processing and reduction processing by the filter processing unit 30 and the image reduction unit 40 can be performed in parallel on the same distortion image. Note that a unit when distortion correction processing, smoothing processing and reduction processing are performed in parallel is not limited to one row of the divided memory region, and the distortion correction processing, the smoothing processing, and the reduction processing may be performed in parallel in units of a plurality of rows of the divided memory region. As described above, according to the semiconductor device (or the image processing method) of the third embodiment, an image after distortion correction can be reduced without outputting the image to the external memory 6, and the processing speed can be remarkably improved.

Figure 9:
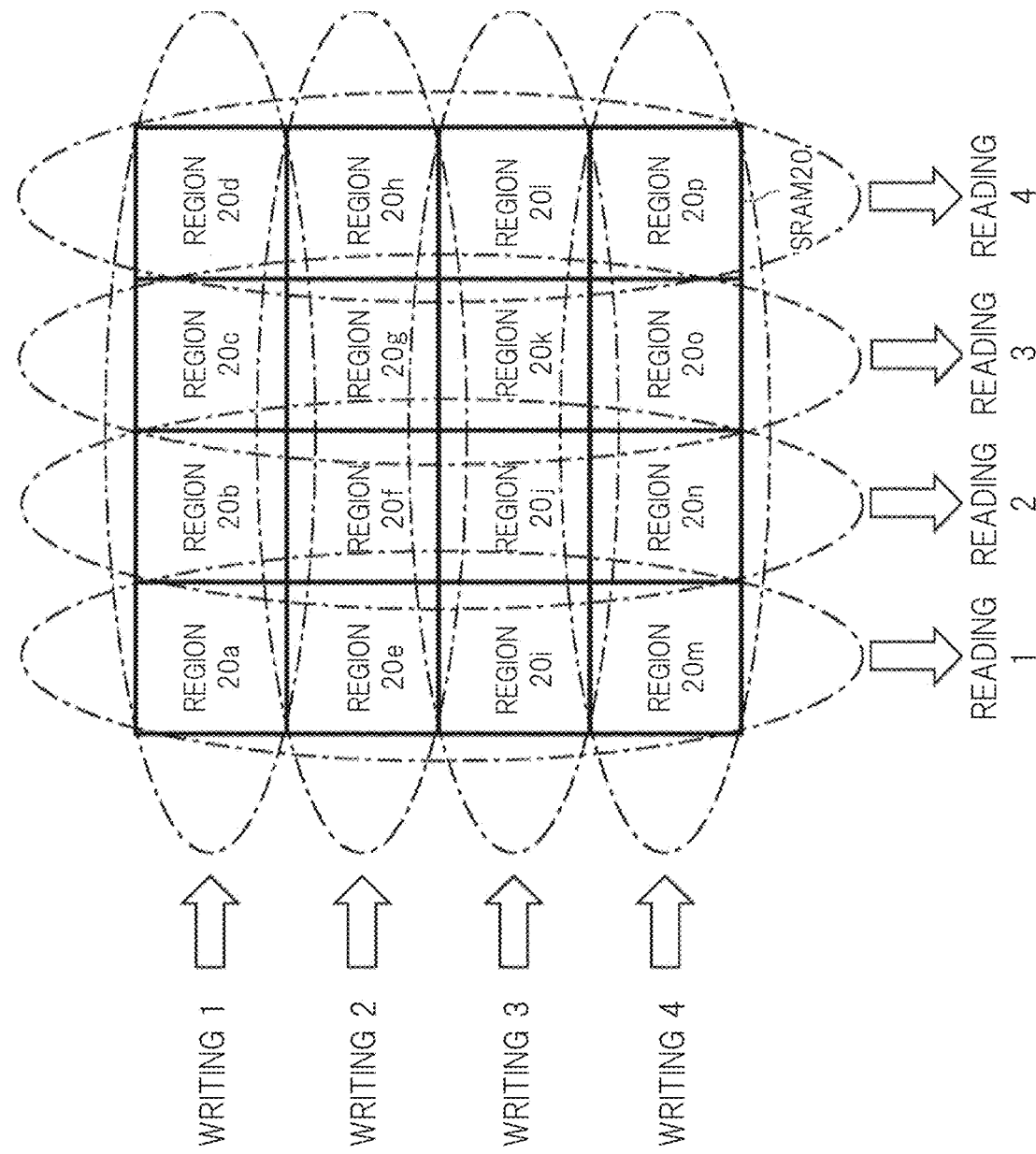
FIG. 9 is a diagram for explaining image transposition processing using the divided memory regions 20a to 20p of the buffer SRAM 20 according to the third embodiment.
Figure 10:
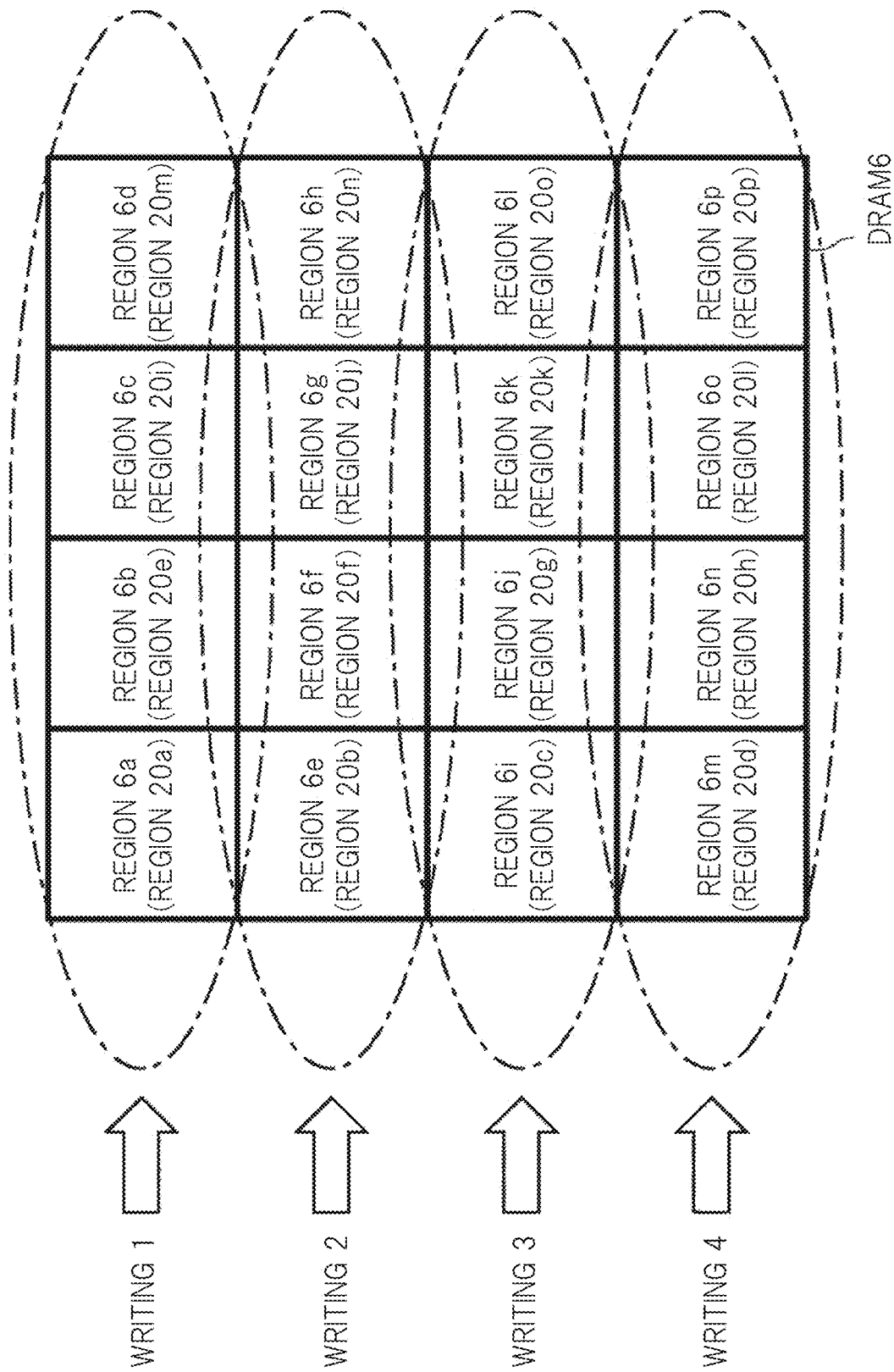
FIG. 10 is a diagram for explaining the image transposition processing using the divided memory regions 20a to 20p of the buffer SRAM 20 according to the third embodiment.

FIGS. 9 and 10 are diagrams for explaining image transposition processing using the divided memory regions 20*a* to 20*p* of the buffer SRAM 20 according to the third embodiment. Replacement of an image refers to processing for generating a new image in which an original image is turned upside down by replacing a x coordinate value and a y coordinate value of each pixel constituting the original image. FIG. 9 is the diagram for explaining writing of distortion correction image data in the buffer SRAM 20 and reading of distortion correction image data from the buffer SRAM 20, and the divided memory regions 20*a* to 20*p* in FIG. 9 correspond to the divided memory regions 20*a* to 20*p* of the buffer SRAM 20, respectively.

FIG. 10 is the diagram for explaining the writing of reduction image data or distortion correction image data in the DRAM 6. Regions 6*a* to 6*p* in FIG. 10 indicate memory regions 6*a* to 6*p* of the DRAM 6, and regions 20*a* to 20*p* in parentheses ( ) in FIG. 10 indicate the divided memory regions of the buffer SRAM 20 from which the image data to be written in the regions 20*a* to 20*p* in parentheses ( ) is read. For example, it indicates that image data written in the region 6*j* of the DRAM 6 is image data read from the divided memory region 20*g* of the buffer SRAM 20.

First, distortion correction image data from the distortion correction unit 10 is written into the divided memory regions 20*a* to 20*p* of the buffer SRAM 20 in this order (write 1 to write 4) in a unit of each divided memory region. Writing each pixel data in each divided memory region is performed as follows. First, the pixel data is sequentially written from a left end to a right end of the uppermost row (the first row) of the region. Next, the row is changed, and then the pixel data is sequentially written from a left end to a right end of the second row of the region. Similarly, the pixel data is sequentially written in the third row and the fourth row of the region. Finally, the pixel data sequentially written from a left end to a right end of the lowermost row of the region.

Next, the distortion correction image data is read from the buffer SRAM 20 in the order of the divided memory region 20*a*, the divided memory region 20*e*, the divided memory region 20*i*, the divided memory region 20*m*, the divided memory region 20*b*, the divided memory region 20*f*, the divided memory region 20*j*, the divided memory region 20*n*, ..., and the divided memory region 20*p* (read 1 to read 4) in a unit of each divided memory region. Reading each pixel data in each divided memory region is performed as follows. First, the pixel data is sequentially read from an upper end to a lower end of the leftmost column (the first column) of the region. Next, the column is changed, and then the pixel data is sequentially read from an upper end to a lower end of the second column of the region. Similarly, the pixel data is sequentially read in the third column and the fourth column of the region. Finally, the pixel data sequentially read from an upper end to a lower end of the rightmost column of the region. At this time, writing the distortion correction image data in the buffer SRAM 20 and reading the distortion correction image data from the buffer SRAM 20 can be performed in parallel as long as these do not apply to the same divided memory region.

When the distortion correction image data read from the buffer SRAM 20 for each divided memory region is written in the DRAM 6 via the filter processing unit 30 and the image reduction unit 40, or is directly written in the DRAM 6 without using the filter processing unit 30 and the image reduction unit 40, the distortion correction image data read from the buffer SRAM 20 in the order of the divided memory region 20*a*, the divided memory region 20*e*, the divided memory region 20*i*, ..., and the divided memory region 20*p* as described above is written in the DRAM 6 in the order of the regions 6*a*, 6*b*, ..., and 6*p* (Write 1 to Write 4). That is, the distortion correction image data read from the divided memory region 20*a* of the buffer SRAM 20 is written in the region 6*a* of the DRAM 6, and the distortion correction image data read from the divided memory region 20*b* of the buffer SRAM 20 is written in the region 6*e* of the DRAM 6.

When the pixel data of the divided memory region 20*a* of the buffer SRAM 20 is written in the region of the DRAM 6, the pixel data read in a column direction in the order from the leftmost column to the rightmost column of the divided memory region 20*a* as described above is written in consecutive addresses of the first row of the DRAM 6 in that order, written in consecutive addresses of the second row, and written in consecutive addresses of the third row. The same applies to the pixel data of the other divided memory regions. By such a process, an image can be transposed by using the divided memory regions 20*a* to 20*p* of the buffer SRAM 20.

When the distortion correction image data is read from the buffer SRAM 20 and written in the DRAM 6, the distortion correction image data can be processed without using the data of the divided memory region as one unit. That is, the distortion correction image data which is continuously read from the column (first column) at the left end of the divided memory region 20*a*, the divided memory region 20*e*, the divided memory region 20*i*, and the divided memory region 20*m* of the buffer SRAM 20 in this order from the top to the bottom is written in the row (first row) at the upper end of the region 6*a*, the region 6*b*, the region 6*c* and the region 6*d* of the DRAM 6 in this order from the left to the right, and similarly, the distortion correction image data which is continuously read from the second column of the divided memory region 20*a*, the divided memory region 20*e*, the divided memory region 20*i*, and the divided memory region 20*m* of the buffer SRAM 20 is written in the second row of the region 6*a*, the region 6*b*, the region 6*c* and the region 6*d* of the DRAM 6. In this way, the image can also be transposed, and efficiencies of reading and writing can be improved.

An image can also be rotated by devising a direction of reading pixel data from the buffer SRAM 20 and a direction of writing pixel data in the DRAM 6. For example, with respect to a certain divided memory region, the image of the divided memory region can be rotated by 90 degrees to the right by reading pixel data from the buffer SRAM 20 in the order from the lower left to the upper left and writing the pixel data in the DRAM 6 in the order from the upper left to the lower left. The same applies to the order of reading and writing of each divided memory region. As described above, according to the semiconductor device (or the image processing method) of the third embodiment, a transposition image, a rotation image, a transposition reduction image, and a rotation reduction image can be obtained in a short time, and a recognition rate of image recognition can be further improved by using these images as recognition target images for image recognition processing.

As described above, in the semiconductor device according to the third embodiment, when the SRAM 20 is divided into a plurality of divided memory regions 20*a* to 20*p* in a matrix form and corrected image data is inputted to divided memory regions belonging to one row or one column, it is preferable that image data from divided memory regions belonging to another row or another column be outputted to the filter processing unit 30.

Further, in the semiconductor device according to the third embodiment, the SRAM 20 is divided into a plurality of divided memory regions 20*a* to 20*p* in a matrix form, and it is preferable that corrected image data is sequentially inputted in the row direction or the column direction of the divided memory regions, and the corrected image data is sequentially outputted in the column direction or the row direction of the divided memory regions to transpose or rotate the corrected image data.

Another Embodiment

Figure 11:
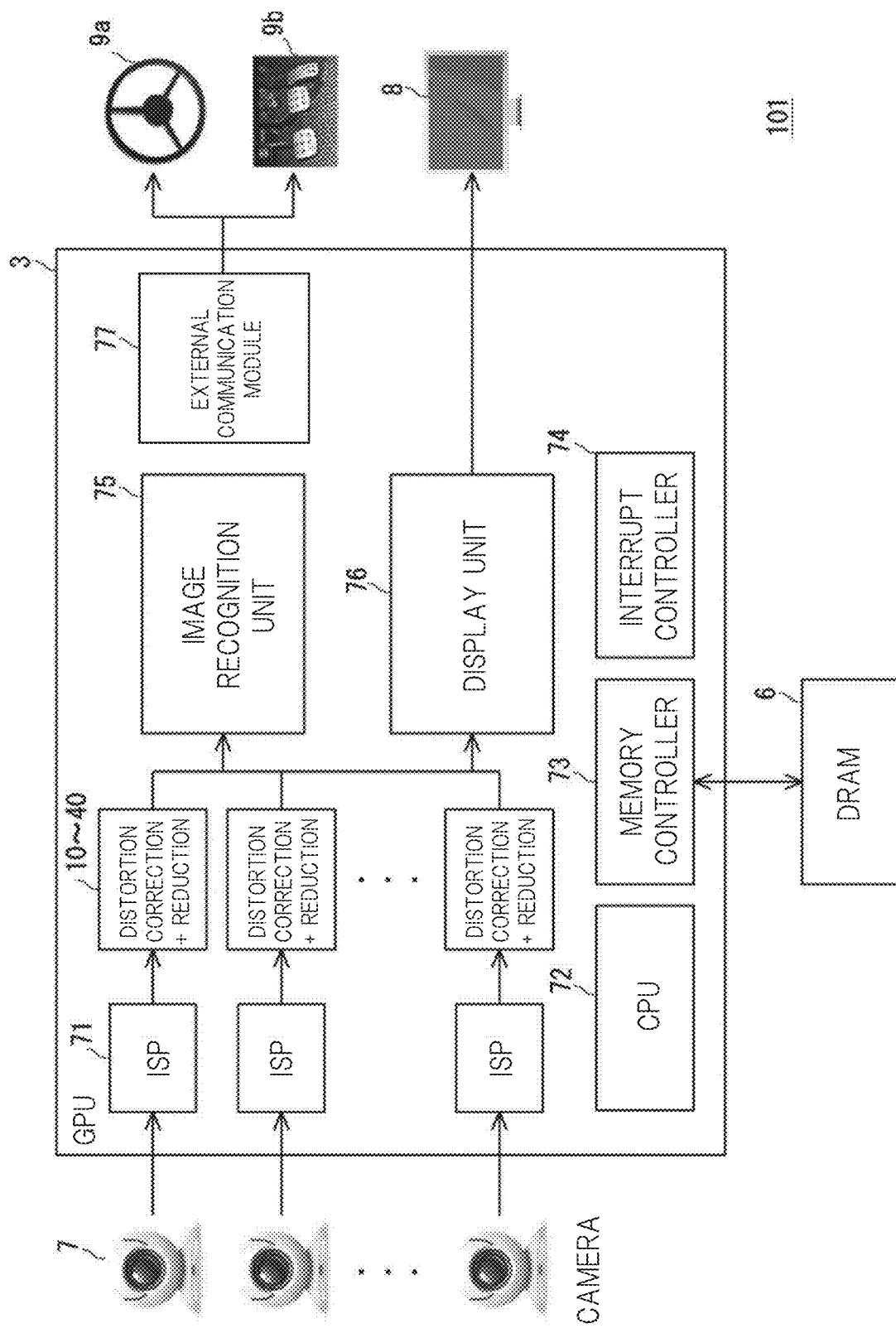
FIG. 11 is a diagram showing a schematic configuration of an image recognition system 101 according to another embodiment.

The semiconductor devices according to the first to the third embodiments may further include an image recognition unit or may be combined with an image recognition device to constitute an image recognition system. FIG. 11 is a diagram showing a schematic configuration of an image recognition system 101 according to another embodiment. The image recognition system 101 recognizes an object using an image, for example, by being mounted on an automobile, installed in a home or a business place, or the like.

The image recognition system 101 includes a plurality of cameras 7, a semiconductor device 3, a monitor 8, and the like. The semiconductor device 3 includes image signal processors (ISPs) 71, the distortion correction units 10, the SRAM 20, the filter processing units 30, the image reduction unit 40, and the like, and performs distortion correction processing and image reduction processing in parallel on images input from the plurality of cameras 7.

The semiconductor device 3 includes a CPU 72, a memory controller 73, an interrupt controller 74, and the like, and writes and reads data in and from the DRAM 6 (external memory). The semiconductor device 3 includes an image recognition unit 75, a display unit 76, an external communication module 77, and the like, and controls a steering wheel 9*a*, a brake 9*b*, and the like of an automobile based on a result of the image recognition unit 75 recognizing an object using a distortion correction image, a reduced image, a rotation image, or the like, or displays a result of the recognition or control on the monitor 8.

Instead of providing the image recognition unit 75 inside the semiconductor device 3, the image recognition system may be provided outside the semiconductor device 3 as an image recognition device or the like. As described above, according to the semiconductor device or the image recognition system of the other embodiment, an image after distortion correction can be reduced without outputting the image to the external memory 6, and the processing speed can be remarkably improved.

As described above, it is preferable that the semiconductor device according to the other embodiment further includes the image recognition unit 75 that recognizes an object using a reduced image. The image recognition system according to another embodiment includes the camera 7 for capturing an image of an object and outputting the image, an external memory 6 for storing an image, the semiconductor device 1 for receiving the image stored in the external memory 6 as a captured image and outputting a reduced image to the external memory 6, and an image recognition device for recognizing the object using the reduced image stored in the external memory 6.

Although the invention made by the present inventors has been specifically described based on the embodiment, the present invention is not limited to the embodiment, and needless to say, various changes may be made without departing from the scope thereof.

What is claimed is:

1. A semiconductor device comprising:
a distortion correction circuit that performs distortion correction processing on image data of a captured image;
a Static Random Access Memory (SRAM) that stores the image data after the distortion correction processing is performed, the stored image data having a size required for performing smoothing filter processing;
a filter processing circuit that 1) receives, from the SRAM, the stored image data after the distortion correction processing and 2) performs the smoothing filter processing on the image data received from the SRAM; and
an image reduction circuit that 1) receives, from the filter processing circuit, the image data after the filter processing is performed and 2) performs reduction processing on the image data received from the filter processing circuit.

2. The semiconductor device according to claim 1, wherein the distortion correction circuit, the SRAM, the filter processing circuit, and the image reduction circuit are provided on a single semiconductor substrate.

3. The semiconductor device according to claim 2, wherein the distortion correction circuit performs the distortion correction processing on image data associated with divided images obtained by dividing the captured image into images each having a size required for the smoothing filter processing, and
wherein after performing the distortion correction processing on the image data associated with the divided images, the image data associated with divided images is stored in the SRAM, and the filter processing circuit performs the smoothing filter processing on the stored image data associated with the divided images.

4. The semiconductor device according to claim 3, wherein the distortion correction circuit reads the divided images from an external memory based on information stored in the external memory, and performs the distortion correction processing on the image data associated with the read divided images.

5. The semiconductor device according to claim 4, wherein the distortion correction circuit reads the divided images from the external memory so that after the distortion correction processing is performed on the image data associated with the divided images, each of the divided images has a rectangular shape.

6. The semiconductor device according to claim 3, wherein each of the divided images has overlapping regions that overlap with adjacent divided images.

7. The semiconductor device according to claim 6, wherein the overlapping regions are provided when an inverse number of a weighting coefficient per one side of a filter used for the smoothing filter processing is smaller than a reduction rate at a time of performing the reduction processing.

8. The semiconductor device according to claim 2,
wherein the SRAM is divided into a plurality of divided memory regions in a matrix form, and
wherein, when the image data, after the distortion correction processing to the image data, is written in the divided memory region belonging to one row or one column, the stored image data is read from the divided memory region belonging to another row or another column and the read image data is output to the filter processing circuit.

9. The semiconductor device according to claim 2,
wherein the SRAM is divided into a plurality of divided memory regions in a matrix form,
wherein the image data stored in the SRAM is sequentially written in a row direction or a column direction of the divided memory regions, and
wherein the image data stored in the SRAM is sequentially read in the column direction or the row direction of the divided memory regions.

10. The semiconductor device according to claim 2, wherein an object is recognized using the image data after the reduction processing is performed on the image data.

11. An image recognition system comprising:
the semiconductor device according to claim 2;
a camera that outputs the captured image;
an external memory that stores the captured image; and
an image recognition device,
wherein the semiconductor device 1) reads the captured image from the external memory, and 2) writes, in the external memory, the image data after the reduction processing is performed on the image data, and
wherein the image recognition device recognizes an object using the image data written in the external memory after the reduction processing is performed on the image data.

12. An image processing method of a semiconductor device that 1) is-configured by a single semiconductor substrate and 2) includes a Static Random Access Memory (SRAM), the image processing method comprising:
performing distortion correction processing on image data of a captured image;
storing, in the SRAM, the image data after the distortion correction processing is performed on the image data, the stored image data having a size required for smoothing filter processing;
reading, from the SRAM, the stored image data;
performing the smoothing filter processing on the image data read from the SRAM; and performing reduction processing on the image data after the smoothing filter processing is performed on the image data.

\* \* \* \* \*